US012001395B2

(12) United States Patent
Kunz

(10) Patent No.: US 12,001,395 B2
(45) Date of Patent: Jun. 4, 2024

(54) REQUEST HANDLING IN A MULTI-PROTOCOL CLOUD ENVIRONMENT

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 33 days.

(21) Appl. No.: 17/962,884

(22) Filed: Oct. 10, 2022

(65) Prior Publication Data
US 2024/0119028 A1    Apr. 11, 2024

(51) Int. Cl.
G06F 16/00    (2019.01)
G06F 16/11    (2019.01)
G06F 16/14    (2019.01)

(52) U.S. Cl.
CPC ......... G06F 16/144 (2019.01); G06F 16/116 (2019.01)

(58) Field of Classification Search
None
See application file for complete search history.

(56) References Cited

U.S. PATENT DOCUMENTS 11,204,818 B1    12/2021    Kunz
2013/0318152 A1    11/2013    Iyer et al.
2017/0344560 A1*  11/2017    Talur .................... G06F 16/182
2020/0364220 A1   11/2020    Kamath et al.
2021/0406071 A1*  12/2021    Groenewald ............ G06F 8/31
2022/0067024 A1    3/2022    Pethe
2022/0197680 A1*   6/2022    Rajadeva ............ G06F 9/45558

OTHER PUBLICATIONS

"European Application Serial No. 23186387.9, Extended European Search Report mailed Feb. 28, 2024", 10 pgs.
Strengholt, Piethein, "Chapter 4 Services and API Managment: The API Architecture", Data Management at Scale. O'Reilly Media, Inc., (2020), 42 pgs.

* cited by examiner

Primary Examiner — AnhTai V Tran
(74) Attorney, Agent, or Firm — SCHWEGMAN LUNDBERG & WOESSNER, P.A.

(57) ABSTRACT

Various examples are directed to systems and methods for operating an application for use with an enterprise database system. A common format process may receive, from a user device, a first request directed to the enterprise database system, convert the first request into a common protocol, and send a first common protocol request to the application logic code. The application logic code may generate a second request in the common protocol and send the second request to the common format process. The common format process may convert the second request from the common protocol to a database query protocol to generate at least one database query and send the at least one database query to the enterprise database system.

20 Claims, 9 Drawing Sheets

REQUEST HANDLING IN A MULTI-PROTOCOL CLOUD ENVIRONMENT

BACKGROUND

Many enterprise software applications are executed in conjunction with an enterprise database system. The enterprise database system stores data for an enterprise including, for example, business data related to manufacturing material management, accounting, billing, human resources, and many other common tasks performed by business enterprises. Enterprise software applications may interact with the enterprise database system to provide functionality to enterprise users using data stored at the enterprise database system.

BRIEF DESCRIPTION OF DRAWINGS

The present disclosure is illustrated by way of example and not limitation in the following figures.

DETAILED DESCRIPTION

Figure 1:
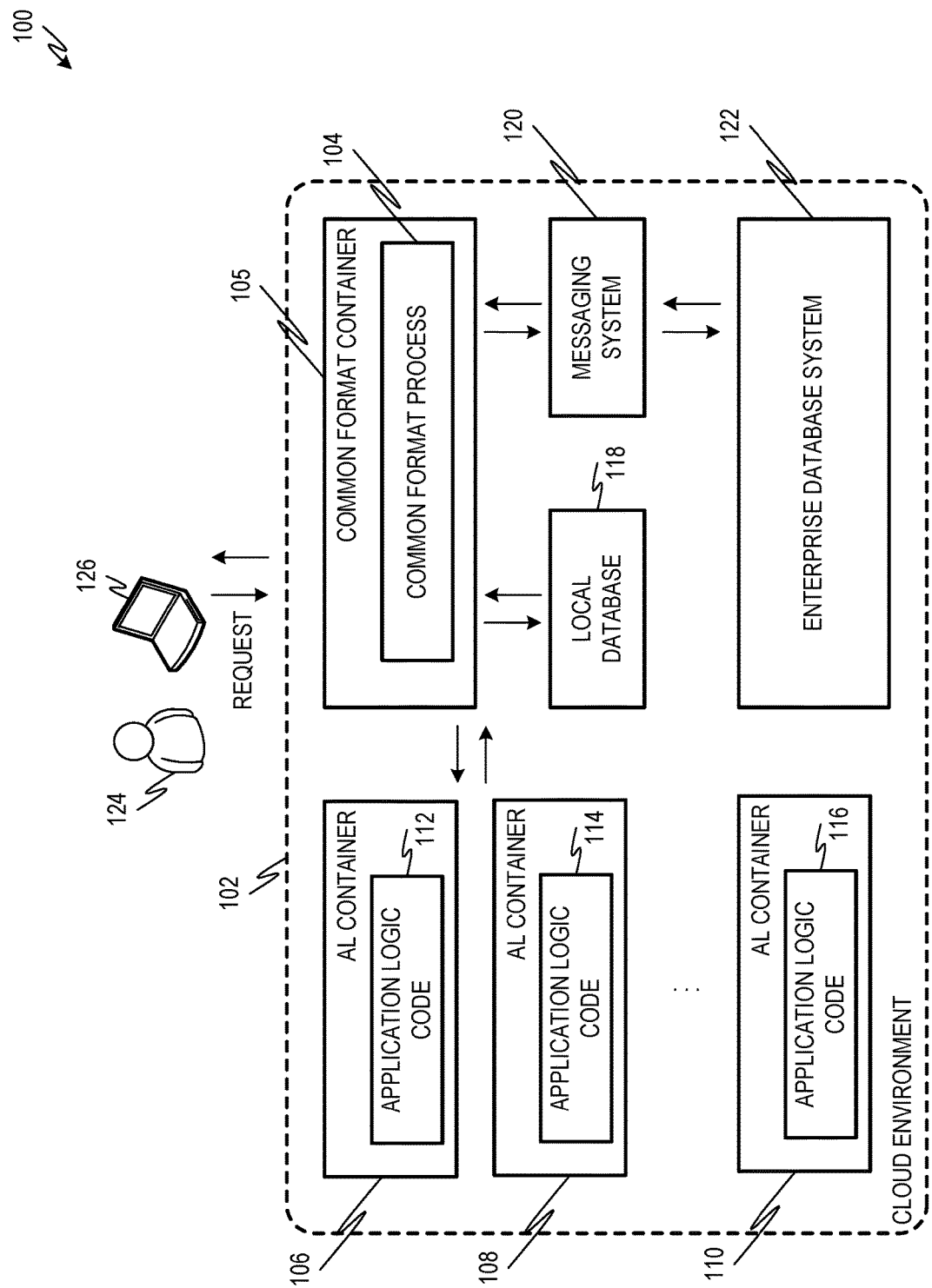
FIG. 1 is a diagram showing one example of an environment for implementing a common format process in a cloud environment.

An enterprise database system may provide data storage and processing to an enterprise such as a business enterprise or other suitable enterprise. An example of an enterprise database system is the S/4 HANA system, available from SAP SE of Waldorf, Germany. An enterprise database system may include functionality for performing various tasks for a customer enterprise such as, for example, tasks related to asset management, finance, manufacturing, research and development, sales, service, sourcing and procurement, supply chain, and/or the like. For many enterprises, however, it is desirable to modify and/or supplement the basic functionalities provided by an enterprise database system. Consider an example enterprise that is a business or other entity having employees. The enterprise may have enterprise-specific requirements or processes for payroll activities. Consider another example enterprise that is a manufacturer of goods. The enterprise may have enterprise-specific requirements or processes for managing inventory, purchasing, and/or the like.

In many enterprise database systems, a customer enterprise may supplement and/or modify the basic functionalities of the enterprise database system by modifying and/or providing application logic code. Application logic code may utilize data stored at the enterprise database system to perform various tasks for the enterprise according to the requirements of a specific enterprise. For example, when a request is received from an enterprise user, application logic code may apply one or more logic rules. Based on the one or more logic rules, the application logic code may respond to the request by making one or more queries to the enterprise database system to write and/or retrieve data.

In some examples, application logic code may execute as a part of an enterprise database system. For example, a customer enterprise may generate application logic code and incorporate the enterprise logic code to execute in conjunction with the enterprise database system. This arrangement, however, has certain disadvantages. For example, if a customer enterprise incorporates its own custom application logic code into the enterprise database system itself, it may be more difficult for that customer enterprise to upgrade the enterprise database system. For example, upgrades to the enterprise database system provided by the developer of the enterprise database system may necessitate upgrades to the application logic code executing with the enterprise database system. Because the application logic code is often modified and/or provided by the customer enterprise, the customer enterprise may need to modify the application logic code to make it compatible with updates to the enterprise database system. Accordingly, a customer enterprise may need to regularly update their own application logic code in order to update the enterprise database system itself.

In some examples, an enterprise database system may support application logic code that executes outside the enterprise database system itself. For example, application logic code may execute in a microservice that is distinct from the remainder of the enterprise database system. The enterprise database system may comprise an interface to interact with customer enterprises' application logic code in a defined way. In this way, it may not be necessary to upgrade the application logic code every time that the enterprise database system is upgraded.

In some examples, an enterprise database system is supplemented by an application programming model, such as the SAP Cloud Application Programming model available from SAP SE of Waldorf, Germany. The application programming model may be a component of the enterprise database system that acts as the interface between the enterprise database system and application logic code. For example, the application programming model may receive user requests, which may be formatted according to ODATA, GraphQL, or another suitable protocol. The application programming model may translate the requests into a common protocol, such as Canonical Query Language (CQL), and provide common protocol requests to various application logic code. The application programming model may also translate messages to a database query protocol, such as Structured Query Language (SQL) or another suitable database query protocol.

Some arrangements utilizing an interface between application logic code in the enterprise database system can suffer from disadvantages. For example, it may be desirable for the interface to operate with application logic coded in different programming languages. For example, some customer enterprises may prefer to code application logic code in the Node.JS, while other customer enterprises may prefer to code in Java or Rust or a different programming language. In some cases, this may prompt the provider of the enterprise database system to develop multiple interfaces, with each interface to operate with application logic code in a different language. This may increase the cost and reduce the efficiency of the enterprise database system. For example, the costs of developing, maintaining, and executing multiple interfaces to support multiple different programming languages may be high.

These and other challenges may be addressed by utilizing a common format process. The common format process may be programmed to translate requests between various different protocols. For example, the common format process may be programmed to translate user requests from ODATA or GraphQL to a common protocol that is readable by application logic codes developed in different programming languages. The common format process may also be programmed to translate from the common protocol to a database query protocol, such as SQL, used by the enterprise database system.

In some examples, the common format process and application logic code may be arranged according to a microservice architecture. In a microservice architecture, different portions of a software solution are implemented by a collection of loosely-coupled microservices executing at the cloud environment. Each microservice may include a single executable that executes in a container implemented by the cloud environment. In a microservice architecture, each microservice is programmed to perform a defined task or small set of tasks and interact with the other microservices in a defined way, for example, according to an application programming interface (API).

The degree of independence between microservices in a microservice-architecture application may facilitate interactions between software components coded according to different programming languages. For example, the common format process may execute within a first container and may be coded according to any suitable programming language such as, for example, Java, Node.JS, Rust, and/or the like. The common format process may interface with one or more application logic codes that are also executing within respective containers. The application logic code may be coded according to various suitable programming languages. Some or all of the application logic code may be coded in a programming language different than the programming language used to code the common format process. In this way, the common format process may be arranged to support application logic code that is programmed in various different programming languages with increased efficiency and reduced expense to the enterprise database system provider.

FIG. 1 is a diagram showing one example of an arrangement 100 for implementing a common format process 104 in a cloud environment 102. The cloud environment 102 may include one or more data centers implementing one or more virtual and/or hardware servers. The cloud environment 102 executes the common format process 104, various instances of application logic code 112, 114, 116, and a messaging system 120. In some examples, cloud environment 102 also executes a local persistence database 118 and an enterprise database system 122.

The common format process 104 may execute within a common format container 105. Instances of application logic code 112, 114, 116 may execute within respective application logic containers 106, 108, 110. Other components at the cloud environment 102 such as, for example, the local persistence database 118, the messaging system 120, and the enterprise database system 122 may also execute within one or more respective containers. In some examples, the cloud environment 102 may implement a container orchestration system to manage the various containers 105, 106, 108, 110, and the like. A container orchestration system may comprise one or more container orchestration services that execute in the cloud environment 102. In some examples, the container orchestration system can be a Kubernetes® container orchestration system.

FIG. 1 also shows an example enterprise user 124 with a user computing device 126. The enterprise user 124 may be a user associated with the customer enterprise that is using the enterprise database system 122 and various instances of application logic code 112, 114, 116 to perform various tasks. Consider an example in which the enterprise database system 122 is used by a customer enterprise to manage employees. The enterprise database system 122 may be configured to store data related to the employees of the customer enterprise. The enterprise user 124, in this example, may be a human resources manager of the customer enterprise and may make requests of the enterprise database system 122 and one or more instances of application logic code 112, 114, 116 to perform human relations-related tasks such as, for example, running payroll. Consider another example in which the customer enterprise manufactures a product. Data regarding the composition and/or manufacturing of the product may be stored at the enterprise database system 122. The enterprise user 124 may be a production manager, engineer, or have another suitable role at the customer enterprise. The enterprise user 124, in this example, may use the enterprise database system 122 and one or more instances of application logic code 112, 114, 116 to perform production-related tasks such as, for example, running a bill of materials (BOM), initiating an order of raw materials, and/or the like.

The enterprise user 124 may access the cloud environment 102 utilizing a user computing device 126. User computing device 126 may be any suitable computing device such as, for example, a desktop computer, a laptop computer, a mobile computing device, and/or the like. In some examples, the user computing device 126 executes a browser program. The enterprise user 124 may utilize the enterprise database system 122 and one or more instances of the application logic code 112, 114, 116 by navigating the browser program to a Universal Resource Locator (URL) associated with the enterprise database system 122. In response, the user computing device 126 may be provided with web application code that executes within the browser. The web application code may be executed within the browser to provide the enterprise user 124 with functionality of the enterprise database system 122 and one or more instances of the application logic code 112, 114, 116, for example, as described herein. Although one enterprise user 124 is shown in FIG. 1, it will be appreciated that customer enterprises utilizing the enterprise database system 122 may have multiple users who may make requests of the enterprise database system 122 as described herein.

The enterprise user 124, via the user computing device 126, may make various requests. Referring again to the example above in which the enterprise user 124 is a human resources manager, the request may include a request to perform a payroll task. Also, referring again to the example in which the enterprise user 124 is a production manager, the request may be a request to run a BOM, initiate an order of raw materials, and/or the like.

The common format process 104 may be configured to process various requests between users, such as the enterprise user 124, application logic code 112, 114, 116, the local persistence database 118, the messaging system 120, and the enterprise database system 122. For example, the enterprise user 124 may generate a request, as described herein. Requests generated by the enterprise user 124 utilizing the user computing device 126 may be formatted according to various different protocols. In some examples, a request generated by the enterprise user 124 may be formatted according to the Odata protocol, the GraphQL protocol, or any other suitable protocol. The request may be received by the common format process 104 and translated to a common protocol the common protocol may be, for example, the CQN protocol utilized SAP SE of Waldorf, Germany, or any other suitable common protocol.

Once the request is converted to the common protocol, the common format process 104 may provide the request to an appropriate instance of the application logic code 112, 114, 116. In some examples, the request will indicate a port name, port number, or other identifier of the application logic code 112, 114, 116 to which the request is directed. The recipient application logic code 112, 114, 116 may receive the request and perform various processing. For example, the application logic code 112, 114, 116 may determine what data and/or processing will be performed to respond to the request.

The application logic code 112, 114, 116 may generate one or more requests directed to the common format process 104. A request generated by the application logic code 112, 114, 116 may be in response to a request initiated by the enterprise user 124. In some examples, the application logic code 112, 114, 116 generates more than one request corresponding to a single request from an enterprise user, such as the enterprise user 124.

Requests generated by application logic code 112, 114, 116 may be directed to the enterprise database system 122 and/or may be directed to the local persistence database 118. The local persistence database 118 may store state data associated with application logic code 112, 114, 116. Although one local persistence database 118 is shown in FIG. 1, in various embodiments, each instance of application logic code 112, 114, 116 may have a corresponding local persistence database 118 for persisting state data. In this way, the application logic containers 106, 108, 110 may remain stateless.

When the common format process 104 receives a request from an instance of the application logic code 112, 114, 116 that is directed to the local persistence database 118, the common format process 104 may convert the request to a database query format such as, for example, SQL or another suitable format. A single request from an instance of the application logic code 112, 114, 116 may be translated into one query or multiple queries in the database query format. The common format process 104 may provide the one or more queries in the database query format to the local persistence database 118. The local persistence database 118 may provide a reply, for example, if the request is a read request. The common format process 104 may convert the reply to the common format and provide the common protocol reply to the requesting application logic code 112, 114, 116.

When the common format process 104 receives a request from an instance of the application logic code 112, 114, 116 that is directed to the enterprise database system 122, the common format process 104 may convert the request to a database query format such as, for example, SQL or another suitable format. A single request from an instance of the application logic code 112, 114, 116 may be translated into one query or multiple queries in the database query format. The common format process 104 may provide the one or more queries in the database query format to the enterprise database system 122, for example, via the messaging system 120. For example, the common format process 104 may provide the one or more queries to the messaging system 120. The messaging system 120 may, in turn, provide the one or more queries to the enterprise database system 122. The enterprise database system 122 may provide a reply, for example, if the request is a read request. The reply may be provided to the common format process 104 via the messaging system 120. The common format process 104 may convert the reply to the common format and provide the common protocol reply to the requesting application logic code 112, 114, 116.

Figure 2:
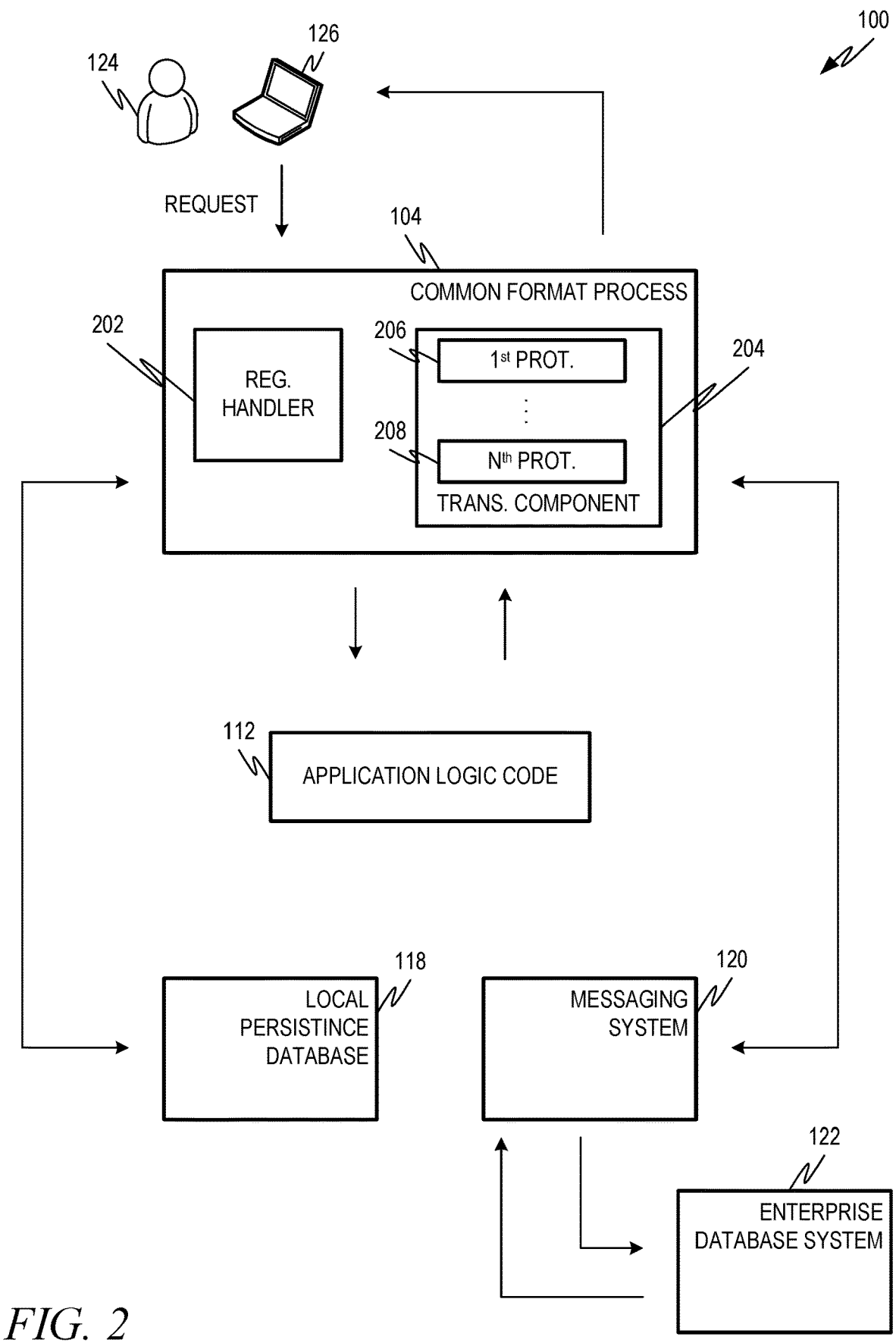
FIG. 2 is a diagram showing another example of the arrangement of FIG. 1 showing additional example details of the various components.

FIG. 2 is a diagram showing another example of the arrangement 100 of FIG. 1 showing additional example details of the various components. In the arrangement 100 of FIG. 2, the enterprise user 124 makes a request directed to the common format process 104 via the user computing device 126. In this example, the request is a Hypertext Transfer Protocol (HTTP) request organized according to the ODATA protocol. In other examples, the request may be organized according to other suitable transfer protocols such as, for example, gRPC.

The common format process 104 may comprise a translation component 204 for translating messages to and from the common protocol. In some examples, the translation component 204 may comprise various protocol components 206, 208 for handling different protocols such as, for example, ODATA, SQL, or other suitable protocols handled by the common format process 104. The common format process 104 may process the incoming request from the enterprise user 124. The processing may include verifying an authorization of the enterprise user 124 to make the request, verifying an integrity of the request, and various other actions for example as described herein with respect to capital FIG. 6. The processing of the request may also include translating the request of the common protocol and providing the request to the appropriate application logic code 112. In the example of FIG. 2, the request is directed to application logic code 112.

In response to receiving the request in the common protocol, the application logic code 112 may generate one or more responses in the common protocol. In some examples, the application logic code 112 may generate a common protocol response that includes a request to access the local persistence database 118. The common protocol response may be provided to the common format process 104 which may convert the common protocol response to one or more queries in the database query format utilized by the local persistence database 118. The common format process may provide the one or more queries to the local persistence database 118 and receive a reply. The reply may be translated to the common protocol and provided to the application logic code 112.

In some examples the application logic code 112 may generate a request directed to the enterprise database system 122. The request, in the common protocol, may be provided to the common format process 104. The common format process 104 may translate the request to one or more queries in the database query protocol used by the enterprise database system 122. The common format process 104 may provide the one or more queries to the enterprise database system, for example by the messaging system 120. The enterprise database system 122, in some examples, provides a response to the queries to the common format process 104, via the messaging system 120. The common format process 104 may appropriately translate the results and provide the results to the enterprise user 124 via the user computing device 126 and/or back to the application logic code 112. Data transmitted to the enterprise user 124 via the user computing device 126 may be translated to the protocol utilized by the user computing device 126 such as, for example, an HTTP request carrying data organized according to the ODATA format. Data transmitted to the application logic code 112 may be translated to the common format.

In the example of FIG. 2, the common format process 104 also includes a registration handler 202. For example, application logic code, such as the application logic code 112, may register with the common format process 104 as described herein with respect to FIG. 7. The registration process, as described herein, may provide common format process 104 with data allowing the common format process 104 to detect requests directed to and/or from the application logic code 112 and appropriately translate and route those requests.

In various examples, the components of the common format process 104 shown in FIG. 1 may execute within the common format container 105. For example, the registration handler 202, translation component 204, and various protocol components 206, 208 may be distinct executables that execute within the common format container 105.

Figure 3:
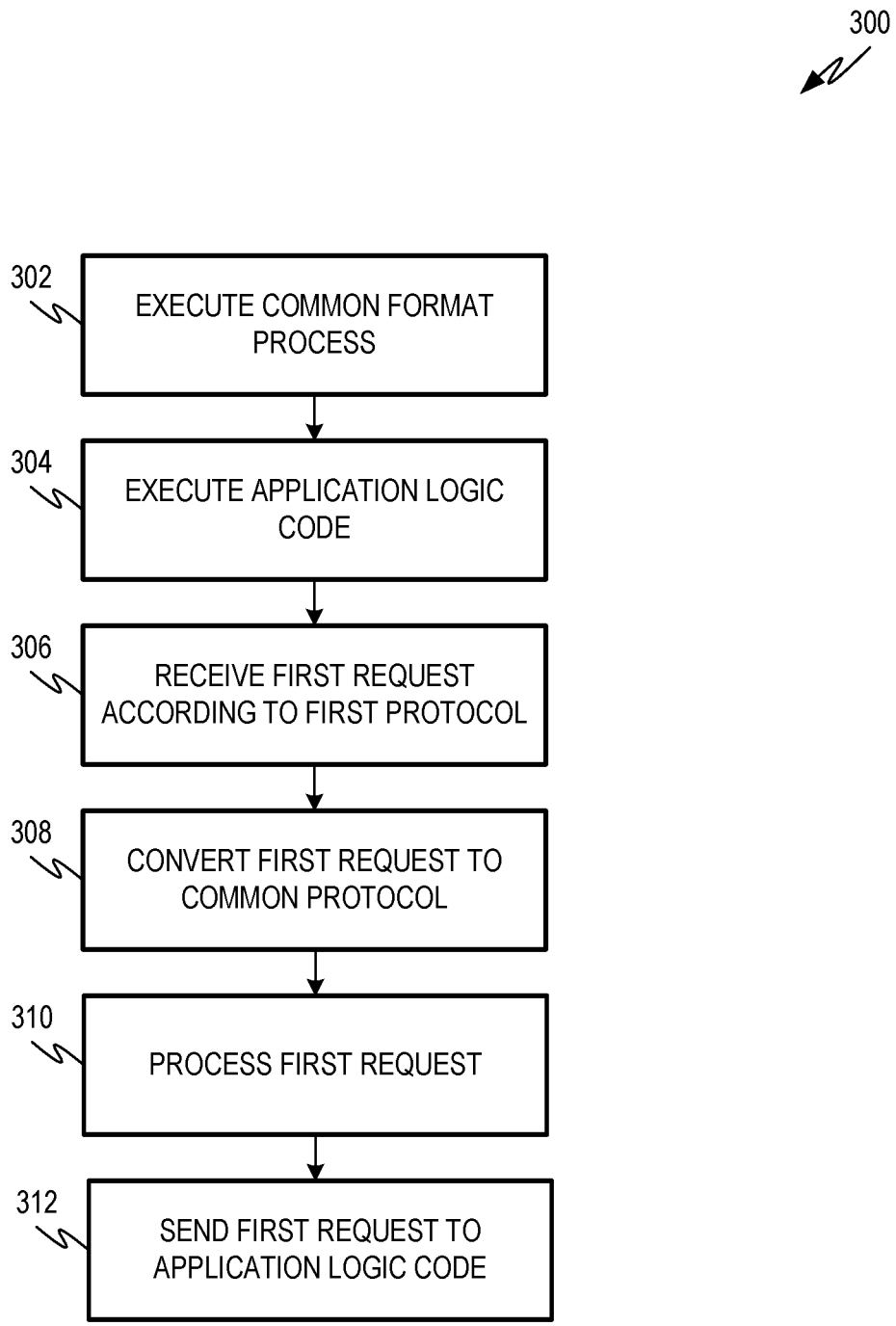
FIG. 3 is a flow chart showing one example of a process flow that may be executed in the arrangement of FIGS. 1 and 2.

FIG. 3 is a flow chart showing one example of a process flow 300 that may be executed in the arrangement 100 of FIGS. 1 and 2. At operation 302, the cloud environment 102 may execute the common format process 104. For example, the cloud environment 102 may access an image describing the common format container 105 including various executables that execute within the common format container 105 to implement the common format process 104. The cloud environment 102 may launch the common format container 105 to cause the one or more executables implementing the common format process 104 to execute within the common format container 105. In some examples, executing the common format process 104 includes launching additional executables within the common format container 105 to execute components of the common format process 104 such as, for example the registration handler 202, the translation component 204, and the various protocol components 206, 208.

At operation 304, the cloud environment 102 may execute an instance of the application logic code 112. This may include, for example, launching the appropriate container 106 and beginning execution of the appropriate application logic code 112 within the container 106. This may include accessing an image describing the application logic container 106 including one or more executables to execute within the container 106 to implement the application logic code 112. The cloud environment 102 may launch the application logic container 106 and cause the one or more executables to execute therein. Although the example of FIG. 3 is described with respect to the application logic code 112, it will be appreciated that a similar process may be performed with respect to other instances of application logic code 114, 116 executing at the cloud environment 102.

At operation 306, the common format process 104 receives a request directed to application logic code 112. The request may be received from an enterprise user 124, as described herein. The request may include a port number or other identifier of the application logic code 112. At operation 308, the common format process 104 may convert the first request to the common protocol. At operation 310, the common format process 104 may process the first request. This may include, for example, verifying that the enterprise user 124 is authorized to make a request, checking the validity of the request, and/or various other operations as described, for example, at FIG. 6. At operation 312, the common format process 104 may send the request to application logic code 112.

Figure 4:
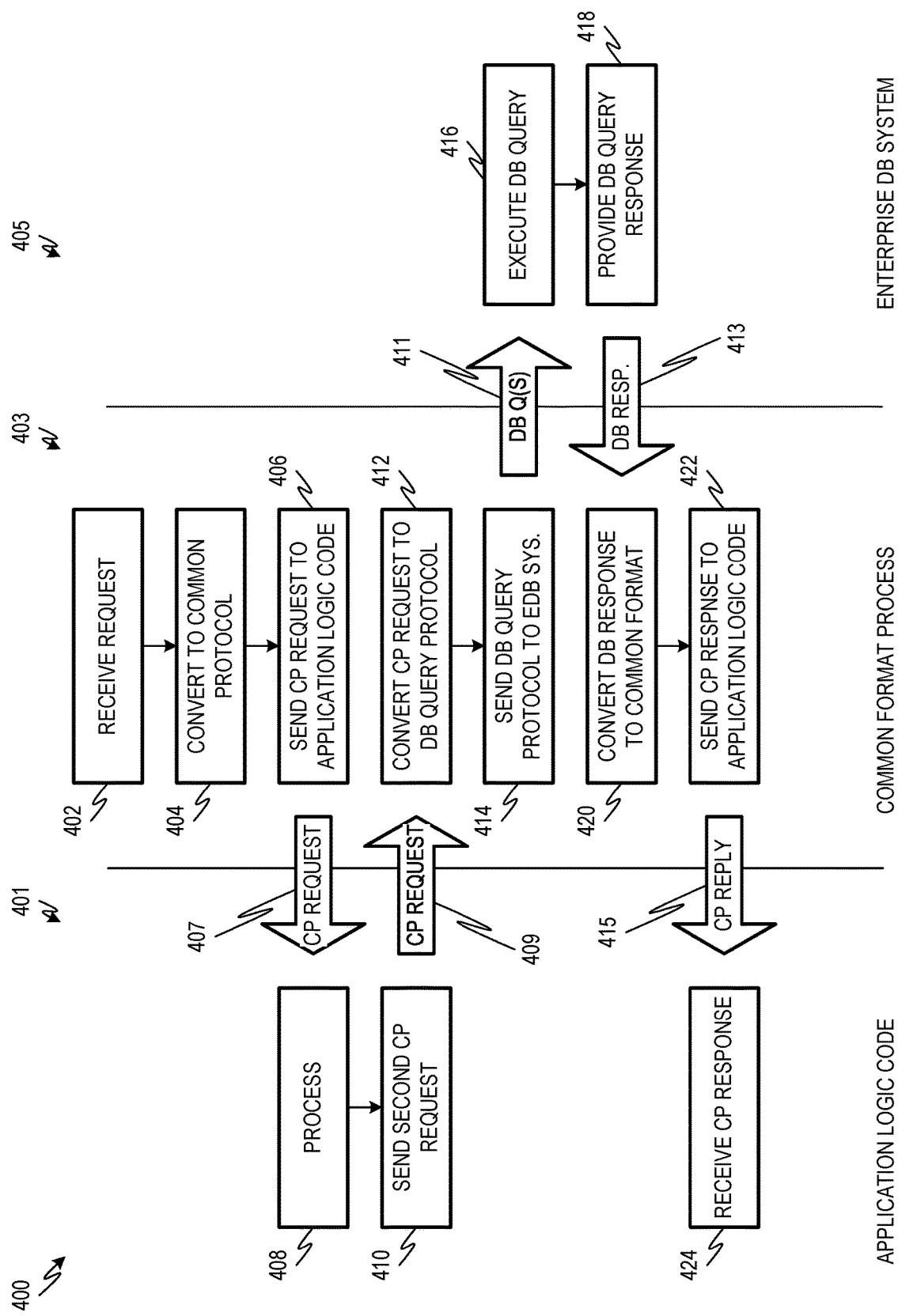
FIG. 4 is a flow chart showing one example of a process flow that may be executed in the arrangement of FIGS. 1 and 2.

FIG. 4 is a flow chart showing one example of a process flow 400 that may be executed in the arrangement 100 of FIGS. 1 and 2. The process flow 400 includes three columns 401, 403, 405. The column 401 includes operations executed by an instance of the application logic code, such as application logic code 112, 114, 116. The example of FIG. 4 is described with reference to application logic code 112. It will be appreciated, however, that the process flow 400 may be executed with respect to other instances of the application logic code 114, 116 as well. The column 403 includes operations performed by the common format process 104. The column 405 includes operations performed by the enterprise database system 122.

At operation 402, the common format process 104 receives a request from the enterprise user 124, via the user computing device 126. At operation 404, the common format process converts the request to the common protocol. The common format process 104 may also perform various processing on the incoming request, for example as described herein. At operation 406, the common format process 104 sends a common protocol request 407 to the application logic code 112.

At operation 408, the application logic code 112 may process the common protocol request 407. This may include, for example, determining one or more requests to be made to the local persistence database 118 and/or to the enterprise database system 122 to respond to the request from the enterprise user 124. At operation 410, the application logic code 112 sends the common protocol request 409 to the common format process 104. The common protocol request 409 may include a requested query to the enterprise database system 122. The requested query may be formatted according to the common protocol and may describe data to be written to and/or read from the enterprise database system 122.

The common format process 104 may receive the common protocol request 409 and convert the common protocol request 409 to one or more database queries according to a database query format at operation 412. At operation 414, the common format process 104 may send the one or more database queries 411 to the enterprise database system 122. This may include sending the one or more database queries 411 to the messaging system 120 which may, in turn, send the one or more queries to the enterprise database system 122. The enterprise database system 122 may execute the one or more database queries at operation 416. This may include, for example, writing data to the enterprise database system 122, for example, if the one or more database queries include a post request. Executing the one or more database queries may also include reading data from the enterprise database system 122, for example, if the one or more database queries include a get request. The enterprise database system 122 may provide a database query response 413 at operation 418. When the database query or queries 411 include a read request, the database query response 413 may include data read from the enterprise database system 122. When the database query or queries 411 include a write request, the database query response 413 may include a confirmation that the requested data was written.

At operation 420, the common format process 104 may convert the database response 413 to the common protocol. At operation 422, the common format process 104 may send a common protocol reply 415 to the application logic code 112. The common protocol reply 415 may include data received from the enterprise database system 122 at the database response 413 translated to the common protocol and, therefore, readable by the application logic code 112. The application logic code 112 may receive the common protocol reply 415 at operation 424. The application logic code 112 may continue its processing based on the common protocol reply 415. For example, the application logic code 112 may make additional requests of the enterprise database system 122, may make a request of local persistence database 118, and/or may direct a reply to the enterprise user 124.

Figure 5:
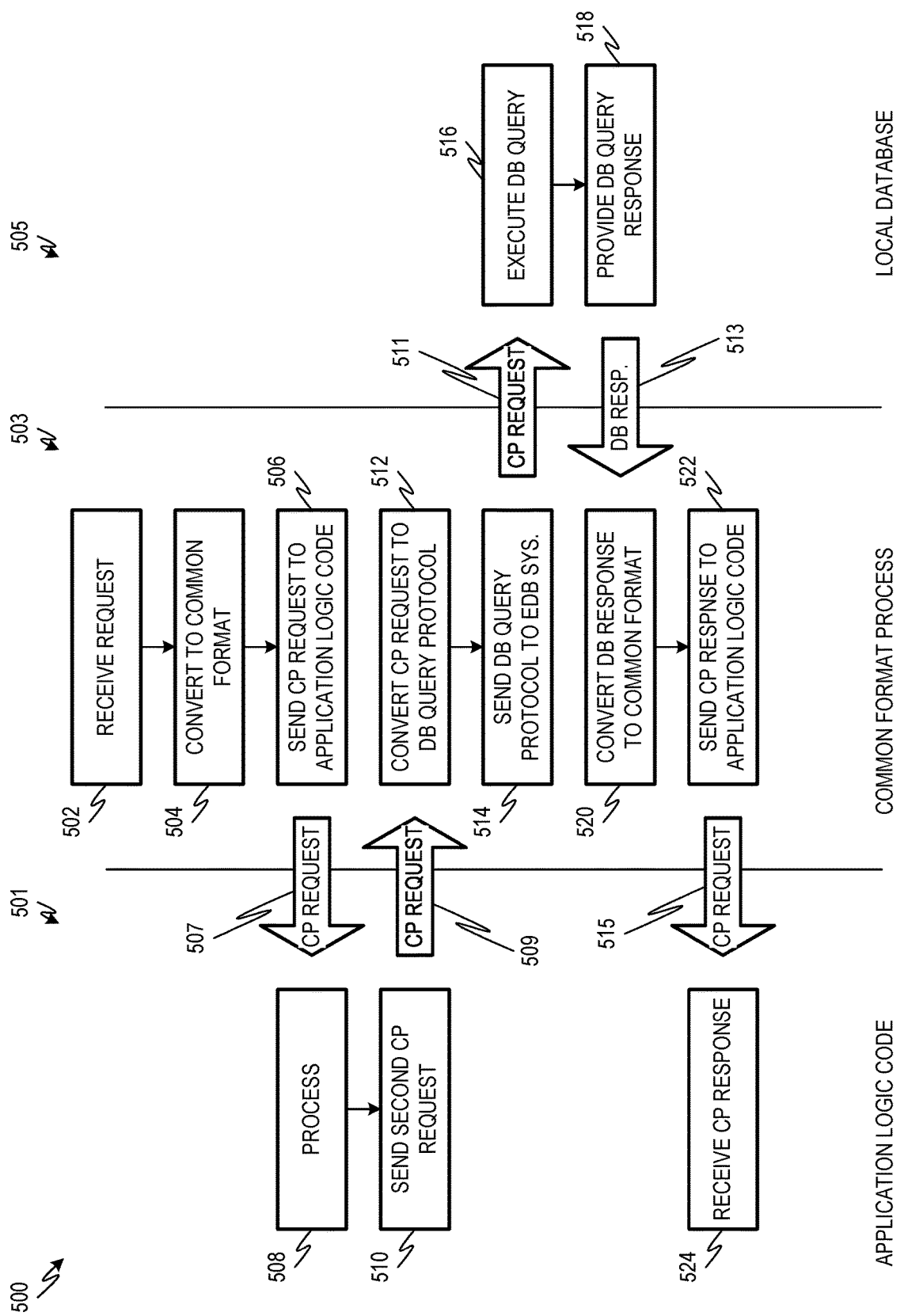
FIG. 5 is a flow chart showing one example of a process flow that may be executed in the arrangement of FIGS. 1 and 2.

FIG. 5 is a flow chart showing one example of a process flow 500 that may be executed in the arrangement 100 of FIGS. 1 and 2. The process flow 500 includes three columns 501, 503, 505. The column 501 includes operations executed by an instance of the application logic code, such as application logic code 112, 114, 116. The example of FIG. 5 is described with reference to application logic code 112. It will be appreciated, however, that the process flow 500 may be executed with respect to other instances of the application logic code 114, 116 as well. The column 503 includes operations performed by the common format process 104. The column 505 includes operations performed by the local persistence database 118.

At operation 502, the common format process 104 receives a request from the enterprise user 124, via the user computing device 126. At operation 504, the common format process 104 converts the request to the common protocol. The common format process 104 may also perform various processing on the incoming request, for example as described herein. At operation 506, the common format process 104 sends a common protocol request 507 to the application logic code 112.

At operation 508, the application logic code 112 may process common protocol request 507. This may include, for example, determining one or more requests to be made to the local persistence database 118 and/or to the enterprise database system 122 to respond to the request from the enterprise user 124. At operation 510, the application logic code 112 sends a second common protocol request 509 to the common format process 104. The second common protocol request 509 may include a requested query to local persistence database 118. The requested query may be formatted according to the common protocol and may describe data to be written to and/or read from the enterprise database system 122.

The common format process 104 may receive the common protocol request 509 and convert the common protocol request 509 to one or more database queries according to a database query format at operation 512. At operation 514, the common format process may send the one or more database queries 511 to the local persistence database 118. The local persistence database 118 may execute the one or more database queries at operation 516. This may include, for example writing data to the local persistence database 118 and/or reading data from the local persistence database 118. The local persistence database 118 may provide a database query response 513 at operation 518. When the database query or queries 511 include a read request, the database query response 513 may include data read from the local persistence database 118. When the database query or queries 511 include a write request, the database query response 513 may include a confirmation that the requested data was written.

At operation 520, the common format process 104 may convert the database query response 513 to the common protocol. At operation 522, the common format process 104 may send a common protocol reply 515 to the application logic code 112. The common protocol reply 515 may include data received from the enterprise database system 122 at the database query response 513 translated to the common protocol and, therefore, readable by the application logic code 112. The application logic code 112 may receive the common protocol reply 515 at operation 524. The application logic code 112 may continue its processing based on the common protocol reply 515. For example, the application logic code 112 may make additional requests of the local persistence database 118, may make a request of enterprise database system 122, and/or may direct a reply to the enterprise user 124.

Figure 6:
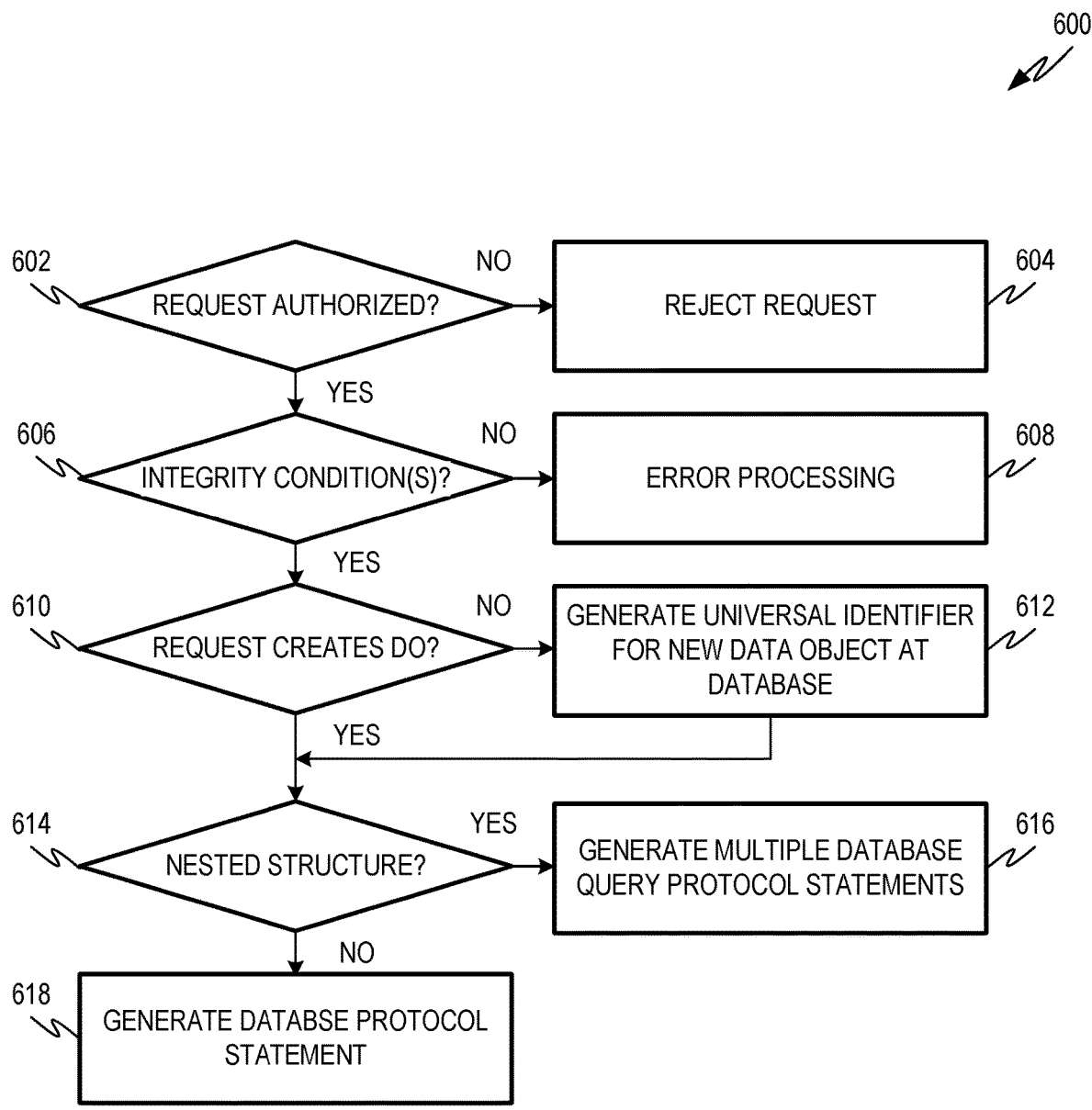
FIG. 6 is a flow chart showing one example of a process flow that may be executed by the common format process upon receiving a request.

FIG. 6 is a flow chart showing one example of a process flow 600 that may be executed by the common format process 104 upon receiving a request. The process flow 600 may be executed when the common format process 104 receives a request from an enterprise user 124 and/or from an instance of application logic code 112, 114, 116. The process flow 600 provides one example of how the common format process 104 may execute the operation 310 of the process flow 300 described herein. Also, it will be appreciated that the operations described in FIG. 6 are examples. The common format process 104 may omit one or more of the operations described in FIG. 6, may add additional operations not described in FIG. 6, and/or may reorder some or all of the operations described in FIG. 6.

At operation 602, the common format process 104 may determine if the request is authorized. A request may be authorized if the party making the request possesses sufficient privileges to make the request. For example, when a request is received from an enterprise user 124, the common format process 104 may determine if the request is authorized by accessing credential data and/or role data describing a credential or role of the enterprise user 124. The role and/or credential data may indicate data, requests, and/or operations at the enterprise database system 122 that can be initiated by the enterprise user 124. The common format process 104 may determine if the enterprise user is authorized to make the received request. Also, in some examples, different instances of application logic code 112, 114, 116 may similarly have privileges at the enterprise database system 122. When the request is received from an instance of application logic code 112, 114, 116, the common format process 104 may determine if the privileges of the application logic code 112, 114, 116 entitled the application logic code 112, 114, 116 to make the request. If the request is not authorized, the common format process 104 may reject the request at operation 604. In some examples rejecting the request may include sending a message to the sender of the request indicating the rejection.

If the request is authorized, at operation 606 the common format process 104 may check the request against one or more integrity conditions. The one or more integrity conditions may determine whether the request includes syntax and/or logical errors. For example, errors considered by integrity conditions may include errors that would prevent the request from being executed and/or errors that would cause the request to return corrupt or otherwise incorrect responses. If the request fails to meet one or more of the integrity conditions, then the common format process 104 may perform error processing on the request at operation 608. This may include, for example, rejecting the request, and/or sending the request back to the sender.

At operation 610, common format process 104 may determine if the request would generate a data object at, for example, the enterprise database system 122 or at the local persistence database 118. For example, a write request, such as a post request, may include data to be written to the enterprise database system 122 and/or to the local persistence database 118. A write request may result in the generation of the data object at the respective database. If the request would generate a data object at the enterprise database system 122 and/or the local persistence database 118, the common format process 104 may, at operation 612, generate a universal identifier (UUID) to describe the new data object. The UUID may be included with one or more database queries generated by the common format process 104 in the database query format. Also, in some examples, the common format process 104 may return an indication of the UUID to the requesting party (e.g., the enterprise user 124 and/or the requesting application logic code 112, 114, 116.

At operation 614, the common format process 104 may determine whether the request reads from and/or writes to a nested data structure at the enterprise database system 122. A nested data structure may be a data structure including a series of components having nested subcomponents organized therein. In some examples, a request that reads from or writes to a nested data structure may be expressed as a plurality of database queries according to the database query protocol. Accordingly, the common format process 104 may convert such a request to a plurality of database queries in the database query format.

Consider example Code Fragment [1], which shows an example ODATA syntax request referenced in a nested data structure in the ODATA protocol, or Code Fragment [2] which shows an equivalent request in Node.js protocol:

| GET . . . / Orders?$expand=header($expand-items) | [1] |
| SELECT.from ('Orders', o => o, '*', o.header (h=>h, '*', h.items('*'))) | |
| | [2] |

Both of these requests would return an array of nested structures from a table called Orders given by Code Fragment [3] below:

[{
   ID:1, title, 'first order', header: {//to-one
     ID:2, status, :'open', items: [{//to-many
   },{
     ID:3, description: 'first order item' },{
     ID:4, description: 'second order item'}]
},
. . .
] [3]

In this example, the common format process 104 may generate from a request indicated by Code Fragments [1] and [2] multiple database queries so as to generate the result given by Code Fragment [3].

At operation 618, the common format process 104 may generate a database query according to the database query protocol. The database query generated at operation 618 and/or the multiple database queries generated at operation 616 may be provided to the enterprise database system 122, for example, via a messaging system 120.

Figure 7:
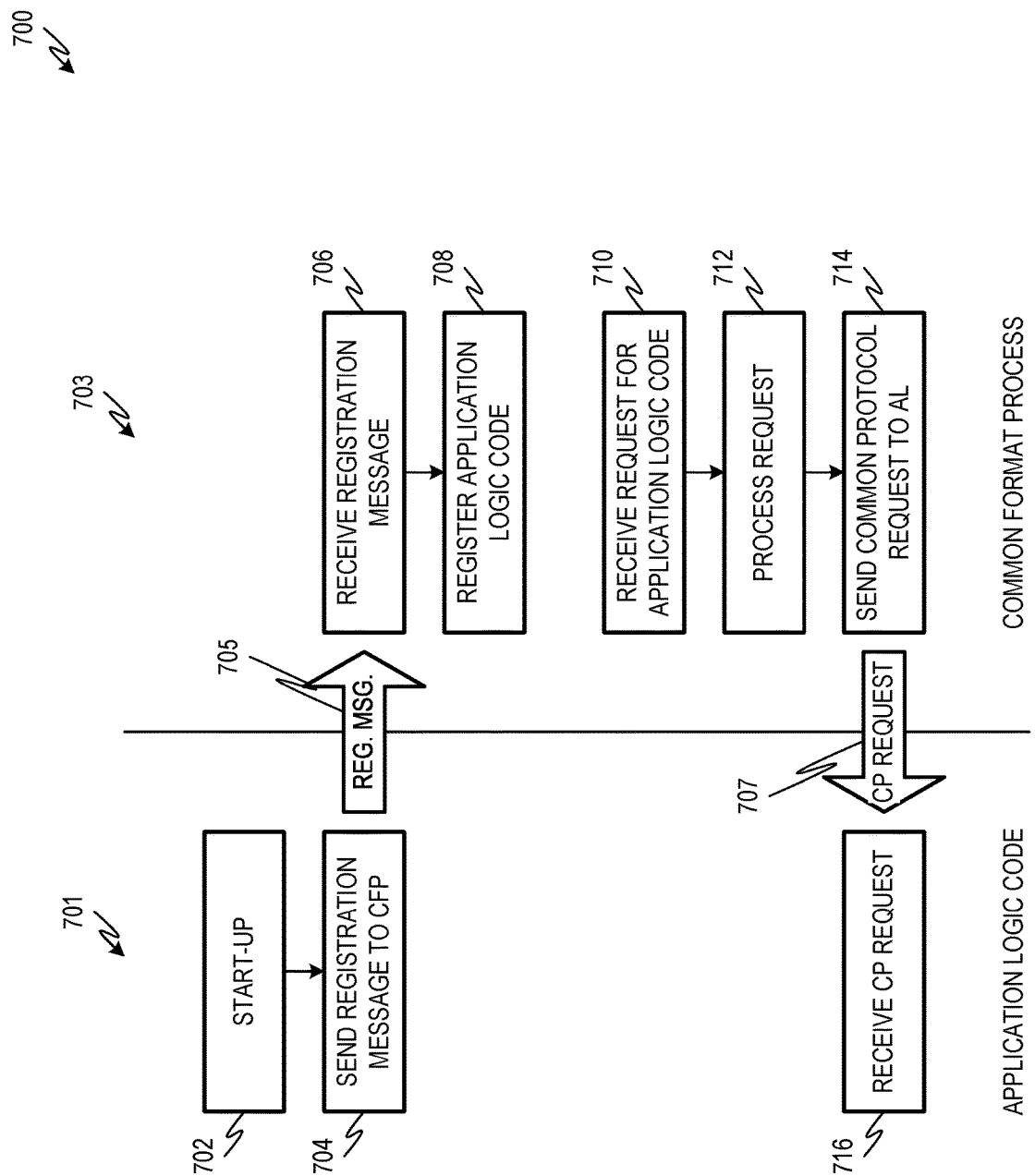
FIG. 7 is a flow chart showing one example of a process flow that may be executed in the arrangement of FIGS. 1 and 2 to register application logic code, such as application logic code.

FIG. 7 is a flow chart showing one example of a process flow 700 that may be executed in the arrangement 100 of FIGS. 1 and 2 to register application logic code, such as application logic code 112, 114, 116. The process flow 700 includes two columns 701, 703. The column 701 includes operations executed by an instance of application logic code 112. The column 703 includes operations executed by the common format process 104. In some examples the operations in column 703 are executed by the registration handler 202 of the common format process 104. The process flow 700 is described with respect to the application logic code 112. It will be appreciated, however, that similar processes may be executed for other instances of application logic code 114, 116.

At operation 702, the application logic code 112 starts up. For example, a cloud environment 102 may utilize an orchestration service to launch application logic container 106. The cloud environment 102 may access, for example, an image describing the application logic container 106 and may implement the image including executing application logic code 112 within the application logic container 106. At operation 704, after start-up, the application logic code 112 may send a registration message 705 to the common format process 104. The registration message 705 may include data describing the application logic code 112 including, for example, a port number associated with the application logic code 112. In some examples, the registration message 705 may also include a port name associated with the application logic code 112. The port number and/or port name may be used by other entities of the arrangement 100 to direct messages to the application logic code 112. For example, a request directed to the application logic code 112 may include the port number and/or port name associated with the application logic code. Accordingly, providing the port number and/or port name to the common format process 104 may facilitate the common format process 104 correctly routing requests intended for the application logic code 112.

The common format process 104 may receive the registration message 705 at operation 706. At operation 708, the common format process 104 may register the application logic code 112. This may include, for example, storing the port number and/or port name associated with the application logic code 112.

At operation 710, common format process 104 may receive a request directed to the application logic code 112. For example, the request received at operation 710 may include the port name and/or port number that is registered for the application logic code 112. At operation 712, the common format process 104 may process the incoming request, for example as described herein. This may include translating the received request to the common protocol. At operation 714, common format process 104 sends a common protocol request 707 corresponding to the received request to the application logic code 112, which receives the common protocol request 707 at operation 716 and may process the common protocol request, for example, as described herein.

EXAMPLES

Example 1 is a system for operating an application for use with an enterprise database system, the system comprising: at least one processor programmed to perform operations comprising: executing a common format process at a first container at a cloud deployment; executing application logic code at a second container at the cloud deployment; receiving, by the common format process and from a user device, a first request directed to the enterprise database system, the first request being formatted according to a first protocol; converting, by the common format process, the first request into a common protocol to generate a first common protocol request; sending, by the common format process, the first common protocol request to the application logic code; generating, by the application logic code, a second request in the common protocol, the second request being based at least in part on the first common protocol request; sending, by the application logic code, the second request to the common format process; converting, by the common format process, the second request from the common protocol to a database query protocol to generate at least one database query; and sending, by the common format process, the at least one database query to the enterprise database system.

In Example 2, the subject matter of Example 1 optionally includes the operations further comprising: receiving, by the common format process and from the application logic code, a request to access a local persistence database, the local persistence database comprising state data associated with the application logic code; converting, by the common format process, the request to access a local persistence database to the database query protocol to generate a local persistence database query; sending, by the common format process, the local persistence database query to the local persistence database; receiving, by the common format process and from the local persistence database, a local persistence database response, the local persistence database response being responsive to the local persistence database query; converting, by the common format process, the local persistence database response to the common protocol to generate a local persistence common protocol response; and sending, by the common format process, the local persistence common protocol response to the application logic code.

In Example 3, the subject matter of any one or more of Examples 1-2 optionally include the operations further comprising determining, by the common format process, that the first request meets at least one integrity condition.

In Example 4, the subject matter of any one or more of Examples 1-3 optionally include the operations further comprising determining, by the common format process, that a user associated with the user device is authorized to make the first request.

In Example 5, the subject matter of any one or more of Examples 1-4 optionally include the second request comprising a write to the enterprise database system, the operations further comprising generating, by the common format process, a universal identifier indicating a new data object at the enterprise database system indicated by the second request, the at least one database query comprising the universal identifier.

In Example 6, the subject matter of any one or more of Examples 1-5 optionally include the converting of the second request from the common protocol to the database query protocol generating a plurality of database queries, the plurality of database queries comprising the at least one database query.

In Example 7, the subject matter of any one or more of Examples 1-6 optionally include the application logic code being coded according to a first coding language, the operations further comprising: receiving, by the common format process and from a second user device, a third request directed to the enterprise database system; converting, by the common format process, the third request into the common protocol to generate a second common protocol request; and sending, by the common format process, the second common protocol request to second application logic code executing at the cloud deployment, the second application logic code being coded according to a second coding language different than the first coding language.

In Example 8, the subject matter of any one or more of Examples 1-7 optionally include the operations further comprising sending a registration message, by the application logic code and to the common format process, the registration message comprising a port identifier associated with the application logic code, the first common protocol request being directed to the port identifier.

Example 9 is a method of operating an application for use with an enterprise database system, the method comprising: executing a common format process at a first container at a cloud deployment; executing application logic code at a second container at the cloud deployment; receiving, by the common format process and from a user device, a first request directed to the enterprise database system, the first request being formatted according to a first protocol; converting, by the common format process, the first request into a common protocol to generate a first common protocol request; sending, by the common format process, the first common protocol request to the application logic code; generating, by the application logic code, a second request in the common protocol, the second request being based at least in part on the first common protocol request; sending, by the application logic code, the second request to the common format process; converting, by the common format process, the second request from the common protocol to a database query protocol to generate at least one database query; and sending, by the common format process, the at least one database query to the enterprise database system.

In Example 10, the subject matter of Example 9 optionally includes receiving, by the common format process and from the application logic code, a request to access a local persistence database, the local persistence database comprising state data associated with the application logic code; converting, by the common format process, the request to access a local persistence database to the database query protocol to generate a local persistence database query; sending, by the common format process, the local persistence database query to the local persistence database; receiving, by the common format process and from the local persistence database, a local persistence database response, the local persistence database response being responsive to the local persistence database query; converting, by the common format process, the local persistence database response to the common protocol to generate a local persistence common protocol response; and sending, by the common format process, the local persistence common protocol response to the application logic code.

In Example 11, the subject matter of any one or more of Examples 9-10 optionally include determining, by the common format process, that the first request meets at least one integrity condition.

In Example 12, the subject matter of any one or more of Examples 9-11 optionally include determining, by the common format process, that a user associated with the user device is authorized to make the first request.

In Example 13, the subject matter of any one or more of Examples 9-12 optionally include the second request comprising a write to the enterprise database system, the method further comprising generating, by the common format process, a universal identifier indicating a new data object at the enterprise database system indicated by the second request, the at least one database query comprising the universal identifier.

In Example 14, the subject matter of any one or more of Examples 9-13 optionally include the converting of the second request from the common protocol to the database query protocol generating a plurality of database queries, the plurality of database queries comprising the at least one database query.

In Example 15, the subject matter of any one or more of Examples 9-14 optionally include the application logic code being coded according to a first coding language, the method further comprising: receiving, by the common format process and from a second user device, a third request directed to the enterprise database system; converting, by the common format process, the third request into the common protocol to generate a second common protocol request; and sending, by the common format process, the second common protocol request to second application logic code executing at the cloud deployment, the second application logic code being coded according to a second coding language different than the first coding language.

In Example 16, the subject matter of any one or more of Examples 9-15 optionally include sending a registration message, by the application logic code and to the common format process, the registration message comprising a port identifier associated with the application logic code, the first common protocol request being directed to the port identifier.

Example 17 is a machine-readable medium comprising instructions thereon that, when executed by at least one processor, cause the at least one processor to perform operations comprising: executing a common format process at a first container at a cloud deployment; executing application logic code at a second container at the cloud deployment; receiving, by the common format process and from a user device, a first request directed to an enterprise database system, the first request being formatted according to a first protocol; converting, by the common format process, the first request into a common protocol to generate a first common protocol request; sending, by the common format process, the first common protocol request to the application logic code; generating, by the application logic code, a second request in the common protocol, the second request being based at least in part on the first common protocol request; sending, by the application logic code, the second request to the common format process; converting, by the common format process, the second request from the common protocol to a database query protocol to generate at least one database query; and sending, by the common format process, the at least one database query to the enterprise database system.

In Example 18, the subject matter of Example 17 optionally includes the operations further comprising: receiving, by the common format process and from the application logic code, a request to access a local persistence database, the local persistence database comprising state data associated with the application logic code; converting, by the common format process, the request to access a local persistence database to the database query protocol to generate a local persistence database query; sending, by the common format process, the local persistence database query to the local persistence database; receiving, by the common format process and from the local persistence database, a local persistence database response, the local persistence database response being responsive to the local persistence database query; converting, by the common format process, the local persistence database response to the common protocol to generate a local persistence common protocol response; and sending, by the common format process, the local persistence common protocol response to the application logic code.

In Example 19, the subject matter of any one or more of Examples 17-18 optionally include the operations further comprising determining, by the common format process, that the first request meets at least one integrity condition.

In Example 20, the subject matter of any one or more of Examples 17-19 optionally include the operations further comprising determining, by the common format process, that a user associated with the user device is authorized to make the first request.

Figure 8:
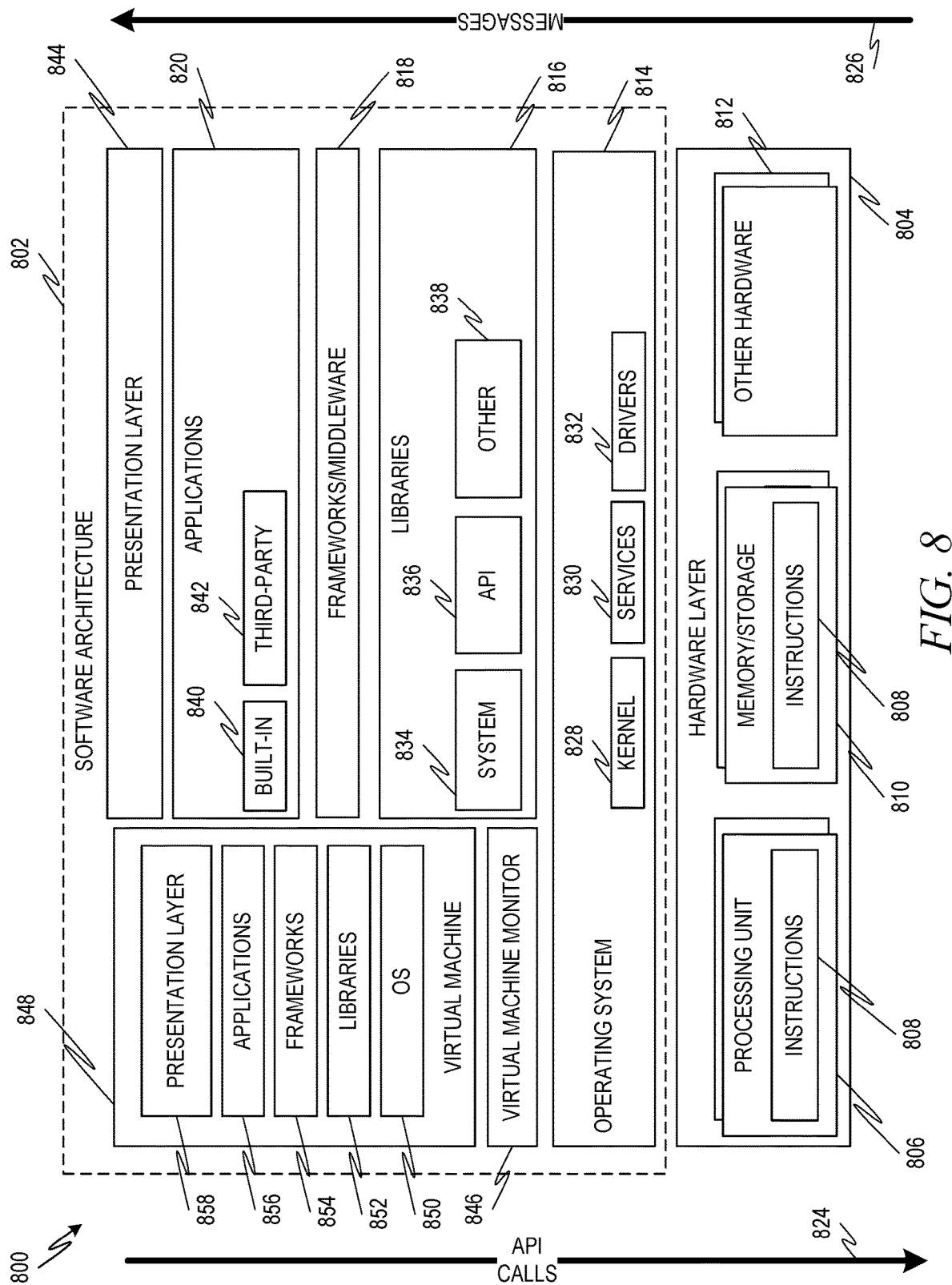
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the software architecture 802 may be conceptualized as a stack of layers where each layer provides particular functionality. For example, the software architecture 802 may include layers such as an operating system 814, libraries 816, middleware layer 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The middleware layer 818 (also sometimes referred to as frameworks) may provide a higher-level common infrastructure that may be utilized by the applications 820 and/or other software components/modules. For example, the middleware layer 818 may provide various graphic user interface (GUI) functions, high-level resource management, high-level location services, and so forth. The middleware layer 818 may provide a broad spectrum of other APIs that may be utilized by the applications 820 and/or other software components/modules, some of which may be specific to a particular operating system or platform.

The applications 820 includes built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system 834, API libraries 836, and other libraries 838), and middleware layer 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
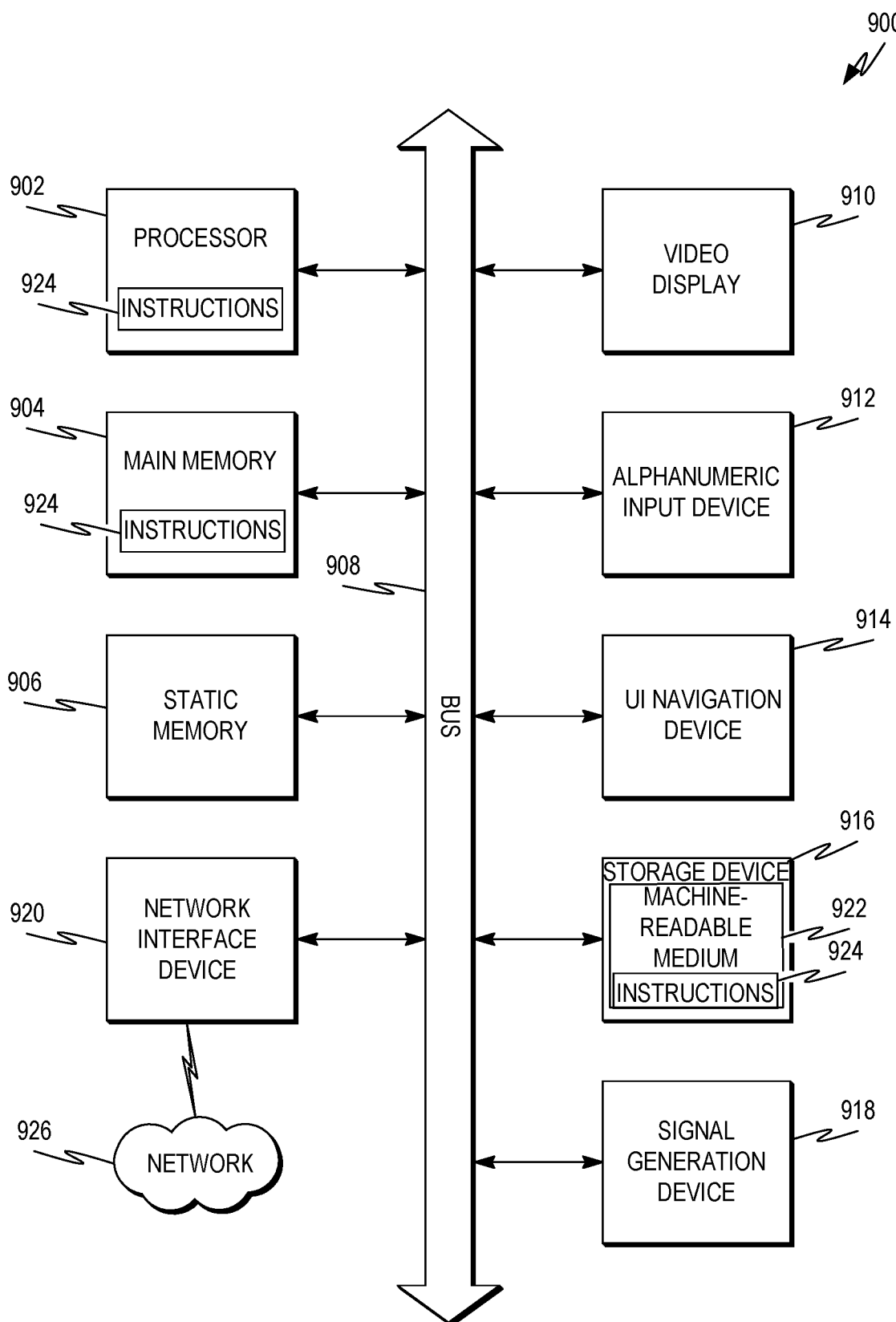
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for operating an application for use with an enterprise database system, the system comprising:
at least one processor programmed to perform operations comprising:
executing a common format process at a first container at a cloud deployment;
executing application logic code at a second container at the cloud deployment;
receiving, by the common format process and from a user device, a first request directed to the enterprise database system, the first request being formatted according to a first protocol;
converting, by the common format process, the first request into a common protocol to generate a first common protocol request;
sending, by the common format process, the first common protocol request to the application logic code;
generating, by the application logic code, a second request in the common protocol, the second request being based at least in part on the first common protocol request;
sending, by the application logic code, the second request to the common format process;
converting, by the common format process, the second request from the common protocol to a database query protocol to generate at least one database query; and
sending, by the common format process, the at least one database query to the enterprise database system.

2. The system of claim 1, the operations further comprising:
receiving, by the common format process and from the application logic code, a request to access a local persistence database, the local persistence database comprising state data associated with the application logic code;
converting, by the common format process, the request to access a local persistence database to the database query protocol to generate a local persistence database query;
sending, by the common format process, the local persistence database query to the local persistence database;
receiving, by the common format process and from the local persistence database, a local persistence database response, the local persistence database response being responsive to the local persistence database query;

converting, by the common format process, the local persistence database response to the common protocol to generate a local persistence common protocol response; and sending, by the common format process, the local persistence common protocol response to the application logic code.

3. The system of claim 1, the operations further comprising determining, by the common format process, that the first request meets at least one integrity condition.

4. The system of claim 1, the operations further comprising determining, by the common format process, that a user associated with the user device is authorized to make the first request.

5. The system of claim 1, the second request comprising a write to the enterprise database system, the operations further comprising generating, by the common format process, a universal identifier indicating a new data object at the enterprise database system indicated by the second request, the at least one database query comprising the universal identifier.

6. The system of claim 1, the converting of the second request from the common protocol to the database query protocol generating a plurality of database queries, the plurality of database queries comprising the at least one database query.

7. The system of claim 1, the application logic code being coded according to a first coding language, the operations further comprising:

receiving, by the common format process and from a second user device, a third request directed to the enterprise database system;

converting, by the common format process, the third request into the common protocol to generate a second common protocol request; and sending, by the common format process, the second common protocol request to second application logic code executing at the cloud deployment, the second application logic code being coded according to a second coding language different than the first coding language.

8. The system of claim 1, the operations further comprising sending a registration message, by the application logic code and to the common format process, the registration message comprising a port identifier associated with the application logic code, the first common protocol request being directed to the port identifier.

9. A method of operating an application for use with an enterprise database system, the method comprising:

executing a common format process at a first container at a cloud deployment;

executing application logic code at a second container at the cloud deployment;

receiving, by the common format process and from a user device, a first request directed to the enterprise database system, the first request being formatted according to a first protocol;

converting, by the common format process, the first request into a common protocol to generate a first common protocol request;

sending, by the common format process, the first common protocol request to the application logic code;

generating, by the application logic code, a second request in the common protocol, the second request being based at least in part on the first common protocol request;

sending, by the application logic code, the second request to the common format process;

converting, by the common format process, the second request from the common protocol to a database query protocol to generate at least one database query; and sending, by the common format process, the at least one database query to the enterprise database system.

10. The method of claim 9, further comprising:

receiving, by the common format process and from the application logic code, a request to access a local persistence database, the local persistence database comprising state data associated with the application logic code;

converting, by the common format process, the request to access a local persistence database to the database query protocol to generate a local persistence database query;

sending, by the common format process, the local persistence database query to the local persistence database;

receiving, by the common format process and from the local persistence database, a local persistence database response, the local persistence database response being responsive to the local persistence database query;

converting, by the common format process, the local persistence database response to the common protocol to generate a local persistence common protocol response; and sending, by the common format process, the local persistence common protocol response to the application logic code.

11. The method of claim 9, further comprising determining, by the common format process, that the first request meets at least one integrity condition.

12. The method of claim 9, further comprising determining, by the common format process, that a user associated with the user device is authorized to make the first request.

13. The method of claim 9, the second request comprising a write to the enterprise database system, the method further comprising generating, by the common format process, a universal identifier indicating a new data object at the enterprise database system indicated by the second request, the at least one database query comprising the universal identifier.

14. The method of claim 9, the converting of the second request from the common protocol to the database query protocol generating a plurality of database queries, the plurality of database queries comprising the at least one database query.

15. The method of claim 9, the application logic code being coded according to a first coding language, the method further comprising:

receiving, by the common format process and from a second user device, a third request directed to the enterprise database system;

converting, by the common format process, the third request into the common protocol to generate a second common protocol request; and sending, by the common format process, the second common protocol request to second application logic code executing at the cloud deployment, the second application logic code being coded according to a second coding language different than the first coding language.

16. The method of claim 9, further comprising sending a registration message, by the application logic code and to the common format process, the registration message comprising a port identifier associated with the application logic code, the first common protocol request being directed to the port identifier.

17. A non-transitory machine-readable medium comprising instructions thereon that, when executed by at least one processor, cause the at least one processor to perform operations comprising:
   executing a common format process at a first container at a cloud deployment;
   executing application logic code at a second container at the cloud deployment;
   receiving, by the common format process and from a user device, a first request directed to an enterprise database system, the first request being formatted according to a first protocol;
   converting, by the common format process, the first request into a common protocol to generate a first common protocol request;
   sending, by the common format process, the first common protocol request to the application logic code;
   generating, by the application logic code, a second request in the common protocol, the second request being based at least in part on the first common protocol request;
   sending, by the application logic code, the second request to the common format process;
   converting, by the common format process, the second request from the common protocol to a database query protocol to generate at least one database query; and
   sending, by the common format process, the at least one database query to the enterprise database system.

18. The non-transitory medium of claim 17, the operations further comprising: receiving, by the common format process and from the application logic code, a request to access a local persistence data base, the local persistence database comprising state data associated with the application logic code; converting, by the common format process, the request to access a local persistence database to the database query protocol to generate a local persistence database query; sending, by the common format process, the local persistence database query to the local persistence database; receiving, by the common format process and from the local persistence database, a local persistence database response, the local persistence database response being responsive to the local persistence database query; converting, by the common format process, the local persistence database response to the common protocol to generate a local persistence common protocol response; and sending, by the common format process, the local persistence common protocol response to the application logic code.

19. The non-transitory medium of claim 17, the operations further comprising determining, by the common format process, that the first request meets at least one integrity condition.

20. The non-transitory medium of claim 17, the operations further comprising determining, by the common format process, that a user associated with the user device is authorized to make the first request.

* * * * *